Nov. 25, 1969     L. E. STATLER     3,479,996
ROTARY ENGINE

Filed Jan. 5, 1968     2 Sheets-Sheet 1

INVENTOR.
LOWELL STATLER
BY
*Townsend and Townsend*
ATTORNEYS

Nov. 25, 1969  L. E. STATLER  3,479,996

ROTARY ENGINE

Filed Jan. 5, 1968  2 Sheets-Sheet 2

INVENTOR.
LOWELL STATLER
BY
Townsend and Townsend
ATTORNEYS

United States Patent Office 3,479,996
Patented Nov. 25, 1969

3,479,996
ROTARY ENGINE
Lowell E. Statler, Box 115, Bellevue, Ohio 44811
Filed Jan. 5, 1968, Ser. No. 695,936
Int. Cl. F02b 53/04
U.S. Cl. 123—15
14 Claims

ABSTRACT OF THE DISCLOSURE

A rotary internal combustion engine having a rotor provided with at least one pair of circumferentially spaced lobes on its outer surface. The rotor is disposed in a cylindrical housing whose inner surface defines with the rotor a chamber through which the lobes pass. One lobe serves to compress fuel in the chamber and to provide an abutement for the rotor when the compressed fuel expands upon ignition whereby the rotor is caused to rotate relative to the housing. The other lobe serves to exhaust combustion gases of a previous combustion stage to the atmosphere and to provide for the intake of fuel to the chamber for the next compression-ignition stage. The wall has movable barriers which cooperate with the lobes to separate the chamber into a number of different, isolated portions.

---

This invention relates to improvements in rotary engines especially adapted for internal combustion operation.

The present invention, as directed to a rotary internal combustion engine, has a cylindrical housing and a lobed rotor of which half the total number of lobes are in sliding contact with the inner wall of the housing, the latter having shiftable barriers which move into and out of the chamber defined between the rotor and the housing. The movement of the barriers is a function of the positions of the lobes on the rotor and the barriers at all times contact the rotor so that the chamber can be divided into a number of different compartments or portions. Such chamber portions define, depending upon the position of the rotor, compression and expansion zones as well as exhaust and intake zones. When the rotor is moving along one path segment relative to the cylindrical housing, the lobes and barriers define a compression zone and an exhaust zone, respectively. Thus, fuel can be compressed in preparation for the power stroke of the engine while exhaust gases from the preceding power stroke or combustion stage can be exhausted to the atmosphere. Similarly, when the rotor is moving along a second path segment relative to the cylindrical housing, the lobes and barriers define an expansion zone and a fuel intake zone. Thus, expanding gases in the expansion zone provides the power stroke for rotating the rotor while fuel is being brought into the intake zone for the next succeeding power stroke.

While rotary engines have been used in the past, the structure of the prior rotary engines has been complicated in that a large number of different components have been required, thus making the production costs relatively high while increasing the probability of malfunction of the engine. The present invention provides an improved rotary engine of simple and rugged construction which is made from a minimum of components and can be readily assembled to thereby minimize production and maintenance costs. The present engine has a power to weight ratio greater than 1:1 and this is accomplished without the use of valves or complete restriction in the flow of gases to the portions of the chamber defined by the cylindrical housing and rotor. The engine of the present invention can be adapted to any use requiring a source of motive power.

One of the primary features of the present invention is the way in which the lobes are arranged so that gases can be compressed in one chamber portion and the compressed gas can then be ignited while remaining in such chamber portion to provide the power stroke for the engine. Thus, the gases do not need to leave the chamber portion to cause the engine to operate. Moreover, the movement of the lobes permits combustion gases to be removed from the chamber portion and to allow fuel to be directed into the chamber portion. Thus, by judicious use of lobes and barriers, the engines can be made to have any number of power strokes for each revolution of the rotor.

This will provide that the power output of the engine will fall in a wide range of values. The limits of the range can be controlled by the number of lobes and barriers used in the engine. Thus, the engine is not limited to a specific number of lobes and barriers.

The primary object of this invention is, therefore, to provide an improved rotary engine which is simple and rugged in construction, has a minimum of components, can be assembled in a minimum of time, and can have a power to weight ratio greater than 1:1 when adapted for internal combustion operation without the use of valves or complete restrictions in the flow of gases to the chamber portions of the engine itself.

Another object of this invention is to provide a rotary engine of the type described wherein the lobes and barriers which form parts of the engine define compression expansion, exhaust and intake zones depending upon the operative position of the rotor during each cycle of rotation thereof so as to eliminate any need for valves, ports and conduits for directing fluid flow to various parts of the engine to achieve the various functions which the lobes and barriers perform.

A further object of the invention is to provide a rotary engine of the aforesaid character wherein the lobes and barriers are arranged so that a number of independent chamber portions are formed with each chamber portion permitting compression, expansion, exhaust and intake of gases so that there may be a power stroke for each chamber portion to thereby permit the power output of the engine to be controlled by the proper selection of the number and positions of the lobes and barriers.

Figure 1:
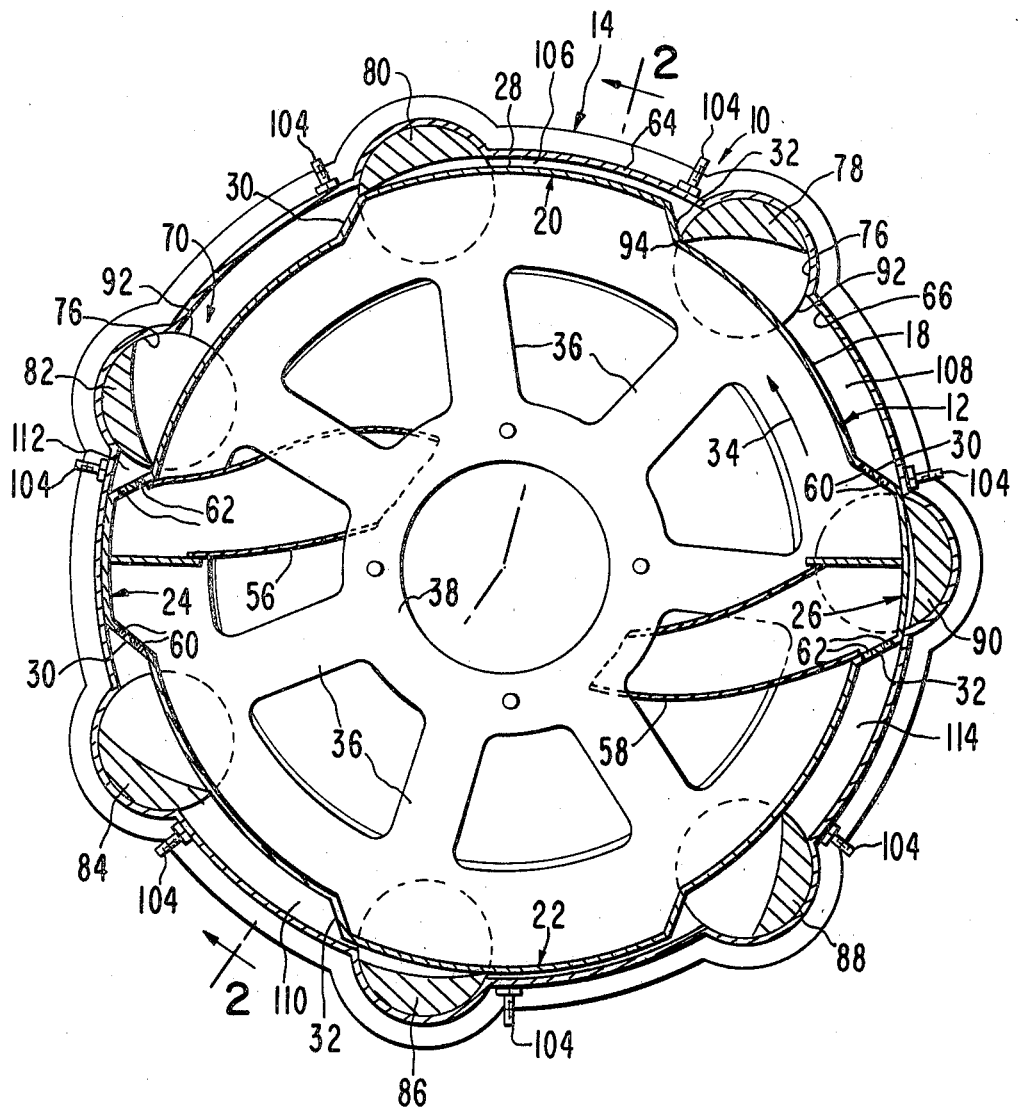
FIG. 1 is a section through the engine showing the lobes on the rotor and the barriers on the housing, taken along the line 1—1 of FIG. 2.

The rotary engine of this invention is broadly denoted by the numeral 10 and includes a rotor 12, a cylindrical housing 14, surrounding rotor 12 and means 16 (FIG. 2) for mounting the rotor for rotation about its central axis. Housing 14 will be generally stationary with respect to rotor 12 so that it can be coupled in any suitable manner to mounting means 16.

Rotor 12 has an outer surface 18 and is provided with a pair of generally diametrically disposed first lobes 20 and 22 and a pair of generally diametrically opposed second lobes 24 and 26. Lobes 20, 22, 24 and 26 are circumferentially spaced apart and extend outwardly from outer surface 18 of rotor 12. Each of the lobes has a circumferentially extending central face 28 and a pair of sloping end faces 30 and 32, each face 30 being in advance of face 32 with respect to the normal direction of rotation of rotor 12, as shown by arrow 34.

Figure 2:
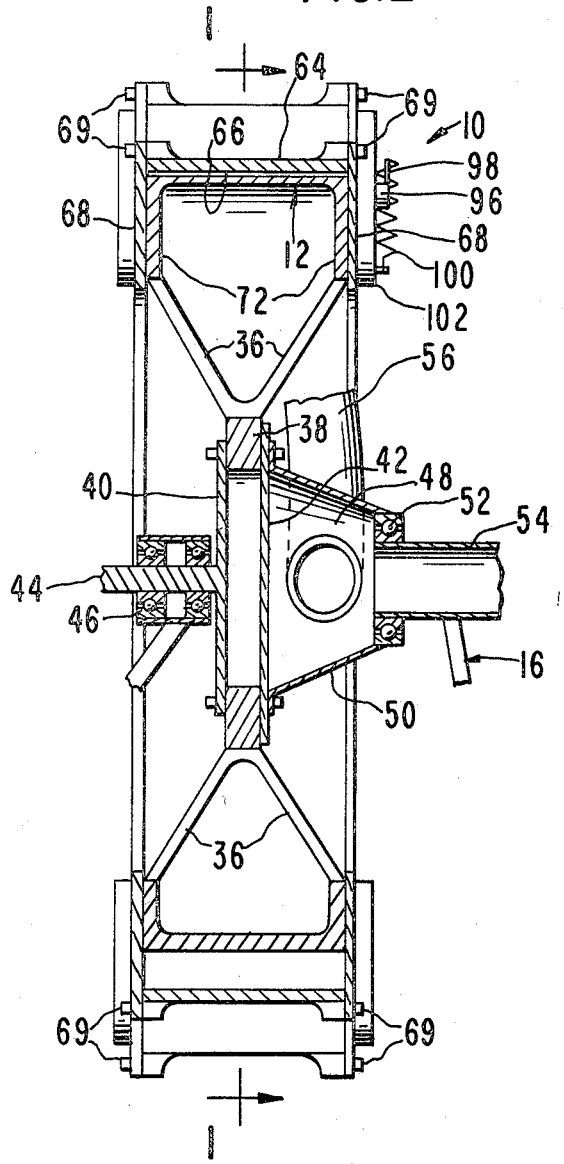
FIG. 2 is a cross-sectional view taken along line 2—2 of FIG. 1.

Rotor 12 further includes a number of spokes 36 which extend outwardly from a central ring 38 to which is connected a pair of plates 40 and 42 (FIG. 2). A power take-off shaft 44 is rigid to plate 40 and is received within a bearing 46 forming a part of mounting means 16. Plate 42 forms one boundary of a plenum chamber 48 whose outer wall 50 is connected by a bearing 52 to pipe 54 forming a part of mounting means 16. Pipe 54 is adapted to be connected to a source of fuel so that fuel may be directed into chamber 48 and through a pair of fuel intake tubes 56 and 58 communicating with chamber 48 and terminating at lobes 24 and 26, respectively (FIG. 1).

The trailing faces 32 of lobes 24 and 26 are provided with passages 62 therethrough which are in fluid communication with tubes 56 and 58, respectively. Passages 62 provide fuel intake ports in a manner to be described.

Figure 3:
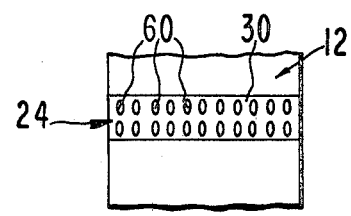
FIG. 3 is an elevational view of one face of the intake-exhaust lobe.
Figure 4:
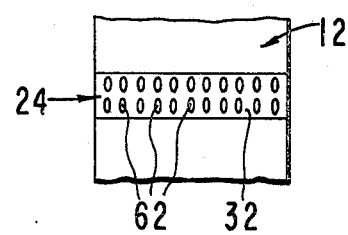
FIG. 4 is an elevational view of the opposite face of the intake-exhaust lobe.

The leading face 30 of each of the lobes 24 and 26 has a number of openings 60 therethrough (FIG. 3) to provide exhaust ports or passages for exhaust gases in a manner to be described.

Housing 14 mounts a generally cylindrical wall 64 having an inner surface 66 spaced outwardly from surface 18 as shown in FIG. 1. Lobes 20 and 22 are spaced inwardly of inner surface 66 and lobes 24 and 26 are in substantially sliding engagement therewith. A pair of opposed sides 68 are rigidly secured by bolts 69 to wall 64 and extend adjacent to and about rotor 12 in the manner shown in FIG. 2. Outer and inner surfaces 18 and 66 and sides 68 form a fluid-tight chamber broadly denoted by the numeral 70 between rotor 12 and wall 64 through which lobes 20, 22, 24 and 26 pass as rotor 12 rotates relative to housing 14. The side portions 72 of rotor 12 are in sliding contact with the inner surfaces of sides 68 as shown in FIG. 2 to achieve the fluid-tight character of chamber 70. A seal can be used between each side portion 72 and the adjacent side 68, if desired. Also, this area can be lubricated by lubrication wicks installed in sides 68.

Wall 64 is provided with a plurality of circumferentially spaced concavities or recesses 76 in which respective barriers are rotatably mounted. A number of recesses 76 are provided, and for purposes of illustration, seven such recesses are shown in FIG. 1. The barriers are denoted by the numerals 78, 80, 82, 84, 86, 88 and 90. Each barrier is coupled to a bearing unit 92 which is rotatably mounted in sides 68 and which allows the respective barrier to rotate relative to wall 64 and rotor 12. Each barrier has an edge 94 extending axially of rotor 12 (FIG. 1) which engages the later at all times. To achieve this, each barrier is biased in a counter-clockwise sense when viewing FIG. 1 and any suitable means can be used to provide this bias force. For purposes of illustration only this bias force is applied by a spring-bias action shown in FIG. 2. Each bearing unit 92 has a shaft 96 which extends outwardly from one of the sides 68 (FIG. 2) and has an arm 98 extending laterally from the shaft. A spring 100 coupled to the outer end of arm 98 is also coupled to the bearing housing 102 so that shaft 96 will be biased in the desired direction.

A fuel ignition device, such as a spark plug or the like, denoted by the numeral 104, is provided adjacent to each of the barriers at the downstream side thereof. Devices 104 are provided to ignite compressed fuel in the portion of chambers 70 adjacent thereto. To this end, a suitable distributor or the like (not shown) may be coupled to devices 104 to provide the necessary electrical current thereto in timed relationship with respect to the rotation of rotor 12.

To cool the barriers during engine operation, they can be made hollow and connected to a source of coolant through their shafts 96, for instance. Also, engine 10 can be cooled by using cooling fins on the outer surfaces of housing 14 and rotor 12. For water cooling, housing 14 and sides 68 could be jacketed.

OPERATION

The operation of engine 10 will be set forth with reference to the relative positions of the lobes and barriers since these components effectively divide chamber 78 into different portions or zones, namely, a compression zone, an expansion zone, an exhaust zone and a fuel intake zone depending upon the positions of the lobes relative to the barriers. In practice, the chamber portion between each pair of adjacent barriers successively becomes a compression zone, an expansion zone, an exhaust zone, and a full intake zone as rotor 12 rotates.

Assuming that the rotor is rotating in a direction of arrow 34 and that the rotor for a given instant of time is in the position of FIG. 1, lobe 20 is at the final stage of the compression portion of the cycle wherein the numeral 106 defines a compression zone which will shortly become an expansion zone as soon as device 104 adjacent to barrier 78 is actuated. However, before this ignition takes place, the succeeding chamber portion denoted by the numeral 108 and disposed between barrier 78 and 90 will define an exhaust zone for exhausting gases from the preceding power stage of the cycle of engine 10. To this end, the ports 60 in face 30 of lobe 26 will exhaust the gases in zone 108 to the atmosphere since rotor 12 is open to the atmosphere at the inner side of the lobes.

For the given position of the rotor of FIG. 1, lobe 22 is about to complete its power stroke inasmuch as therein compressed fuel has previously been ignited by ignition device 104 adjacent to barrier 84 and trailing face 32 of lobe 22 acts as an abutment against which the expanding gases are forced so that the rotor is caused to rotate in a counter-clockwise sense. The expansion zone 110 is disposed between barriers 84 and 86 and is also bounded by outer and inner surfaces 18 and 66, respectively.

In the FIG. 1 position of rotor 12, lobe 24 is in the position to cause fuel to be drawn into the chamber portion denoted by the numeral 112, the fuel being brought into the chamber through tube 56. The fuel is drawn in by suction since barrier 82 defines one boundary of zone 112 and because lobe 24 moves away from barrier 82 creating a reduced pressure in zone 112.

As rotor 12 continues to rotate from the position of FIG. 1 along another segment of its path of travel, device 104 adjacent to barrier 78 will have ignited the compressed fuel in zone 106 so that this chamber portion now becomes an expansion zone with trailing face 32 of lobe 20 being forced by the expanding gases in a counter-clockwise sense to in turn cause rotation of the rotor. During this time, exhaust gases from the preceding power stroke will be exhausted from zone 108 to the atmosphere through opening 60 in face 30 of lobe 26. Lobe 22 will have finished its power stroke and lobe 24 will continue to move to cause fuel to be drawn into chamber 112, the latter progressively increasing in volume until lobe 24 passes barrier 84. When this occurs, the fuel will remain in zone 112 until lobe 20 enters this region and causes compression of the fuel due to the spacing between the central face 28 of lobe 20 and inner surface 66 of wall 64.

As lobe 26 continues to move, trailing face 32 of lobe 26 eventually enters the region between barrier 78 and 90 and thereby causes a fuel intake action in this region due to the suction created by the movement of lobe 26 away from barrier 90. Lobe 26 will previously have drawn fuel into the chamber portion denoted by the number 114, whereupon lobe 22 will move into the region between barriers 88 and 90 and compress this fuel. After trailing face 32 of lobe 22 has entered zone 114, device 104 adjacent to barrier 88 is actuated to ignite the compressed fuel.

In summary, the region between each pair of barriers becomes successively a compression zone, expansion zone, an exhaust zone, and a fuel intake zone. This region becomes a compression zone when either of the lobes 20 and 22 enter and pass through the same, the region becomes an expansion zone after the trailing face 32 of either of lobes 20 and 22 has entered the region and the corresponding device 104 is actuated. The region becomes an exhaust zone when leading face 30 of either of lobes 24 and 26 enters and passes through this region. Finally, the region becomes a fuel intake zone when the trailing face 32 of either of the lobes 24 and 26 passes into and through the region. Since there are seven such regions there will be seven power strokes for each of the lobes 20 and 22 for a total of 14 power strokes for each revolution of rotor 12. Thus, there will be fourteen compression stages, fourteen expansion stages, fourteen exhaust stages, and fourteen intake stages for each revolution of the rotor. The number of these stages can become, of course, increased or decreased by varying the number of lobes and barriers. Thus, the power output of engine 10 can have a value within a wide range so that the engine will be adapted for a wide variety of uses.

Each lobe thus serves a dual function so that the engine is highly efficient and has a minimum number of parts. The end face configurations of lobes 24 and 26 eliminate the need for valves and the positions of the lobes relative to inner surface 66 of wall 64 and relative to the barriers allow each chamber portion to provide for at least one power stroke for each revolution of the rotor.

As shown in FIG. 1, the circumferential length of each of the lobes 20 and 22 is slightly less than the distance between a pair of adjacent barriers. This provides for the ignition of compressed fuel in each chamber portion at precisely the right instant of time. Also, the circumferential length of each of the lobes 24 and 26 is at least equal to the chord of each barrier extending from the corresponding edge 92. This feature is to assure that there will be not fluid path between adjacent chamber portions past the barrier common thereto.

The rotary engine of this invention can be used in other applications if desired. For instance, it can be used as a compressor wherein lobes 20 and 22 can be used to compress a fluid in the chamber portions between adjacent pairs of barriers, the compressed fluid being removed from the chamber portions by any suitable means such as valves or the like substituted for the ignition devices 104.

While one embodiment of this invention has been shown and described, it will be apparent that other adaptations and modifications can be made without departing from the true spirit and scope of the invention.

What is claimed is:

1. In a rotary engine: a cylindrical wall having an inner surface; a rotor substantially concentric with said wall and rotatable relative thereto along a generally circular path, said rotor having an outer surface adjacent to and spaced from said inner surface; means defining a pair of opposed sides adjacent to said wall and said rotor, said sides defining with said inner and outer surfaces a generally fluid-tight chamber; a pair of circumferentially spaced lobes carried by said rotor and extending outwardly therefrom and into said chamber, one of the lobes being in proximity to and spaced from said inner surface and the other lobe being in substantially sliding engagement with said inner surface; barrier means carried by said wall and movable into and out of said chamber as a function of the positions of said lobes therein, said barrier means defining with said one lobe a compression zone and with said other lobe an exhaust zone when the rotor moves along one segment of said circular path relative to said wall, said barrier means defining with said one lobe an expansion zone and with said other lobe a fuel intake zone when said rotor moves along a second segment of said circular path relative to said wall; exhaust means coupled with said exhaust zone when the rotor moves along said first segment for removing combustion gases from said exhaust zone; fuel intake means coupled with said intake zone when the rotor moves along said second segment for directing fuel into said intake zone; and means coupled with said compression zone for igniting the compressed fuel therein when the rotor is adjacent to the end of said first segment whereby the rotor will be advanced toward and along said second segment.

2. In a rotary engine as set forth in claim 1, wherein said other lobe has a pair of opposed, perforate faces extending outwardly from said outer surface, said exhaust means communicating with said exhaust zone through one of said faces and said intake means communicating with said intake zone through said other face.

3. In a rotary engine as set forth in claim 1, wherein each lobe has a central face in proximity to said inner surface and a pair of spaced, opposed end faces, the central face of said one lobe being spaced from said inner surface and the central face of the other lobe being in substantially sliding engagement with said inner surface.

4. In a rotary engine as set forth in claim 1, wherein said barrier means includes three circumferentially spaced barriers, a first and second of the barriers defining the compression zone with said one lobe and the second and third barriers defining said exhaust zone with said other lobe when the rotor moves along said first segment, said first and second barriers defining said expansion zone with said one lobe and said second and third barriers defining said intake zone when the rotor moves along said second segment.

5. A rotary engine comprising: a rotor having an outer surface; means mounting said rotor for rotation about its central axis; a pair of circumferentially spaced lobes secured to said rotor and extending outwardly from said outer surface thereof, each lobe having a central, circumferentially extending face and a pair of opposed circumferentially spaced end faces; a cylindrical wall surrounding said rotor and having an inner surface spaced from said outer surface of the rotor, said wall having a pair of opposed sides extending toward and along the outer side margins of said rotor and defining with said inner and outer surfaces a generally fluid-tight chamber, the central face of one of the lobes being in proximity to and spaced from said inner surface and the central face of the other lobe being in substantially sliding engagement with said inner surface, said rotor being rotatable relative to said wall to permit said lobes to move through said chamber; at least three circumferentially spaced barriers carried by said wall for movement relative thereto into and out of said chamber; means biasing each barrier inwardly of said chamber and toward and into engagement with said rotor, whereby the barriers will be engaged by said lobes and moved out of said chamber, a first and second of said barriers defining with said one lobe a compression zone and the second and third barriers defining with said other lobe an exhaust zone when the rotor moves along a first path segment relative to said wall, said first and second barriers defining with said one lobe an expansion zone and the second and third barriers defining with the other lobe a fuel intake zone when the rotor moves along a second path segment relative to said wall; exhaust means coupled with said other lobe for removing exhaust gases from said exhaust zone; fuel intake means coupled with said other lobe for directing fuel into said intake zone; and means coupled with said wall adjacent to said second barrier for igniting the compressed fuel in said compression zone.

6. A rotary engine as set forth in claim 5, wherein each barrier includes a rotatable member having a rotor-engaging edge extending axially of the rotor.

7. A rotary engine as set forth in claim 5, wherein the end faces of said other lobe are perforate, the leading end face of the other lobe defining one boundary of said exhaust zone and being disposed to exhaust the latter to the atmosphere, said intake means including a tube coupled to the trailing face of said other lobe and movable therewith.

8. A rotary engine as set forth in claim 7, wherein said other lobe, said third barrier and said inner surface define said intake zone, said other lobe being movable away from said third barrier as said rotor moves along said second path segment to cause said intake zone to progressively increase in volume and to create a region of reduced fluid pressure in said tube to thereby draw said fuel into said intake zone by suction.

9. A rotary engine as set forth in claim 5, wherein each barrier includes a rotatable member having a rotor-engaging edge spaced from the axis of rotation thereof, the circumferential length of the central face of said one lobe being less than the distance between the first and second barriers and the circumferential length of the central face of the other lobe being at least equal to twice the distance from the axis of each barrier to its rotor-engaging edge.

10. A rotary engine as set forth in claim 5, wherein said compression zone is defined by said first barrier, said inner and outer surfaces, said second barrier, and the central and leading end faces of said one lobe, said expansion zone being defined by said first barrier, said inner and outer surfaces, said second barrier, and said central and trailing end faces of said one lobe, said exhaust zone being defined by said second barrier, said inner and outer surfaces, said third barrier, and said leading end face of said other lobe, said intake zone being defined by the trailing end edge of said other lobe, said inner and outer surfaces and said third barrier.

11. A rotary engine comprising: a rotor having an outer surface; means mounting the rotor for rotation about its central axis; a pair of first lobes and a pair of second lobes, said lobes being secured to said rotor and extending outwardly from said outer surface thereof with the lobes being circumferentially spaced apart and with each second lobe being between said first lobes and opposed to the other second lobe; a cylindrical wall surrounding the rotor and having an inner surface spaced from said outer surface of the rotor, said wall having a pair of sides adjacent to and extending along said rotor and defining with said inner and outer surfaces a generally fluid-tight chamber through which the lobes pass as the rotor rotates about said axis, each lobe having a circumferentially extending central face, the central face of each first lobe being spaced from and in proximity to said inner surface and the central face of each second lobe being in substantially sliding engagement with said inner surface; a plurality of circumferentially spaced barriers shiftably mounted on said wall and movable into and out of said chamber; means biasing said barriers into the chamber and into engagement with said rotor, whereby the barriers will be engaged by said lobes and thereby be moved outwardly of the chamber, each first lobe defining with a pair of adjacent barriers of compression zone and the next succeeding second lobe defining with one barrier of said pair and the next succeeding barrier and exhaust zone when the rotor moves along a first path segment relative to said wall, each first lobe defining with a pair of adjacent barriers an expansion zone and the next succeeding second lobe defining with one barrier of the last-mentioned pair and next succeeding barrier a fuel intake zone when the rotor moves along a second path segment relative to said wall; means coupled with each second lobe for placing the corresponding exhaust zone in fluid communication with a region exteriorly of said chamber; means coupled with each second lobe for placing the corresponding intake zone in fluid communication with a source of fuel; and means adjacent to at least a pair of said barriers for igniting the compressed fuel in corresponding compression zones.

12. A rotary engine as set forth in claim 11, wherein each first lobe has a trailing face with respect to said direction of rotation, said igniting means being disposed to ignite the compressed fuel after the trailing face of each first lobe has entered said compression zone.

13. A rotary engine as set forth in claim 11, wherein said igniting means includes a fuel ignition device adjacent to the downstream side of each barrier, respectively.

14. In a rotary engine: a rotor movable along an arcuate path of travel and having an outer suface and at least a pair of circumferentially spaced lobes projecting outwardly from said outer surface; an arcuate wall adjacent to said path and having an inner surface spaced from and extending along said outer surface with at least one of the lobes engaging in sliding adjacent relation to the inner surface; at least a pair of circumferentially spaced arcuate shaped barriers each having an axis pivotally mounted about the axis threof on said wall for movement toward and away from said rotor; means continuously biasing each barrier in pivotal action toward the rotor so one edge is continuously in contact therewith; means defining with said rotor and said wall a generally fluid-tight chamber between said barriers, said chamber defining a fluid compression zone when the rotor moves along a first path segment; and exhaust means coupled with said chamber for exhausting fluid therefrom.

References Cited

UNITED STATES PATENTS

| 1,193,808 | 8/1916 | McCarthy. | |
| 1,225,056 | 5/1917 | Riggs | 123—15 |
| 2,827,024 | 3/1958 | Arietti | 123—15 |
| 2,938,505 | 5/1960 | Quartier | 123—15 |

C. J. HUSAR, Primary Examiner

U.S. Cl. X.R.

123—13